Figure 1:
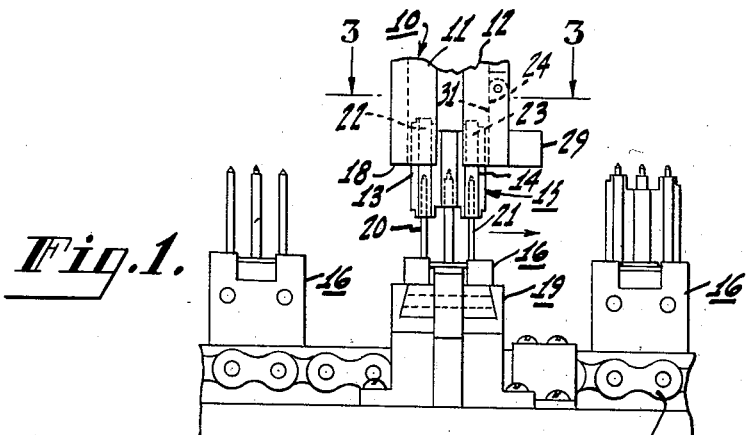

April 22, 1958  F. J. PILAS ET AL  2,831,239
SAFETY RELEASE FOR AUTOMATIC MOUNTING APPARATUS
Filed April 24, 1953

INVENTORS:
FRANK J. PILAS
ROY K. WOLKE &
JOHN A. CHASE
BY William A. Zalesek
ATTORNEY United States Patent Office 2,831,239
Patented Apr. 22, 1958

2,831,239

SAFETY RELEASE FOR AUTOMATIC MOUNTING APPARATUS

Frank J. Pilas, Lyndhurst, Roy K. Wolke, Maplewood, and John A. Chase, Nutley, N. J., assignors to Radio Corporation of America, a corporation of Delaware Application April 24, 1953, Serial No. 350,948

3 Claims. (Cl. 29—25.19)

The present invention relates to automatic apparatus for mounting electron tube parts wherein such parts are loaded on build-up tools or jigs during momentary stoppages thereof between intermittent movements. More particularly, the invention concerns a safety release, for safely releasing a jammed part from a loading member to permit the jig to move away from the loading member after a loading operation without damaging the apparatus or the part loaded, and completing the loading of the part referred to.

The instant invention relates to an improved feature that may be associated to advantage with the apparatus shown and described in copending application of John A. Chase et al., Serial No. 218,838, filed April 2, 1951, for Apparatus for Automatic Assembly of Electron Tube Parts to Form an Electrode Cage and assigned to the same assignee as the present application. In said copending application an apparatus is described for automatically mounting electron tube parts to form a diode type of electrode cage. The apparatus includes a plurality of build-up tools or jigs mounted on an endless chain for intermittent movement through several loading stations. The jigs are provided with mandrels extending normal to the direction of travel of the jigs for entering apertures or channels in the tube parts aforementioned.

One of the loading stations includes structure for loading an anode on a jig referred to. The anode comprises a structure including a tubular portion for accommodating a cathode sleeve and side wings extending in opposite directions from said tubular portion and provided with channels adapted to receive two of said mandrels during a loading operation. The structure of the anode loading station includes a fixed vertical chute having a lower delivery end adjacent the path of travel of said jigs and so positioned as to be in vertical registry with a jig during a stoppage thereof between intermittent movements. In this position, the channels in the side wings of an anode delivered by said chute are in vertical registry with the two mandrels aforementioned and in normal operation the anode is released by the chute and freely falls onto the jig with said two mandrels entering said channels in the anode.

However, in some instances, an anode becomes stuck or jammed in the chute after a partial release thereby. If such partial release is of sufficient magnitude to cause partial entrance of said two mandrels into said anode channels, it is apparent that the anode in such stuck position, will be engaged both by the fixed chute and by the intermittently movable jig. Further intermittent movement of the jig will therefore cause serious damage to the apparatus and the anode in question.

It is therefore a purpose of the invention to provide means for preventing damage to a mounting apparatus and a part being mounted, when said part is stuck in engagement with two relatively movable elements of said apparatus.

A further purpose is to provide a mounting apparatus having releasable means in a loading member thereof for releasing a part to be loaded that is jammed in a partly loaded position and for completing the loading of said part.

Another object is to provide a chute type loading member having a releasable wall portion adjacent its loading end, for releasing from said chute and completing the loading of a work piece stuck in said chute adjacent said end thereof and in partial engagement with a movable jig, to prevent damage to said chute and jig and said work piece and to avoid interruption of a loading operation.

A further object is to provide a safety release at the delivery end of a chute type loading member, for safely releasing a work piece stuck in said delivery end.

Another purpose is to provide a loading member including a chute having walls extending to its delivery end for guiding a work piece to a jig movable in a predetermined direction and wherein one of said walls adjacent said end is movable outwardly in said predetermined direction for releasing from said delivery end said work piece when stuck therein and engaged by said jig.

A further purpose is to provide a chute having a movable wall portion adjacent its delivery end adapted normally for service as a guide for work pieces delivered by said chute, and for movement with a work piece stuck between said chute and a movable receiving member for release of said work piece without damage to said work piece or to the chute and receiving member.

In one embodiment of the invention, a fixed chute for electron tube anodes is provided, having a vertical portion terminating in a lower delivery end. Adapted to move intermittently across said delivery end is a build-up tool or jig. The jig is provided with a plurality of mandrels extending upwardly therefrom. Each anode is provided with two channels for receiving two of said mandrels when mounted on said jig. When the jig is in a stationary position below the delivery end of the chute, the upper ends of the two mandrels aforementioned are spaced from said delivery end a distance less than the length of said anode. Therefore, an anode stuck at the delivery end of the chute may also be partly threaded on said two mandrels.

To prevent damage to the parts involved on further intermittent movement of the jig with an anode stuck in the chute as aforementioned, a safety release is provided according to the invention, that safely releases the anode from its stuck position in the chute, and urges the anode to complete its delivering movement. To provide the safety release, a portion of a side wall of the chute extending to the delivery end thereof and disposed at the side of the chute facing the direction of intermittent movement of the jig, is rendered movable with respect to the chute so as to provide a side exit from the chute for a stuck anode.

The wall portion referred to may comprise a structure hingedly mounted at its upper portion on a pin extending through a chute wall, and adapted normally to occupy a slot formed in said wall. The pivotal mounting aforementioned of the release member permits it to swing out of said slot and away from said wall when a stuck anode bears against said member in movement with a jig laterally away from said chute. The pivoted member may be L-shaped and provided at its free end with transverse portion providing a weight extending outwardly from the chute and urging the member into said slot where it serves as a part of the chute wall for guiding the anode during a loading operation. This weight also engages the top of a released anode and urges the anode downward into fully mounted position on the jig.

Figure 2:
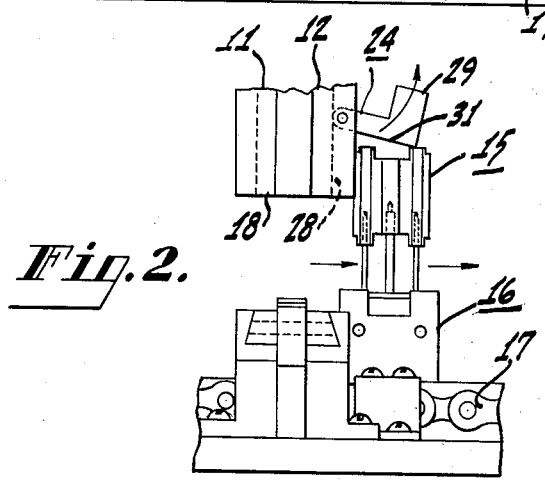
Figure 3:
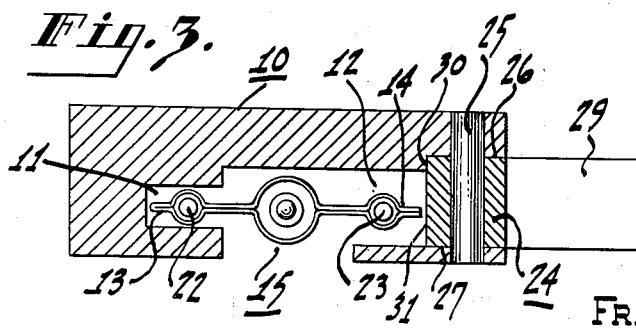

Further features and purposes of the invention will become apparent from the following and more detailed description of an embodiment of the invention taken in connection with the appended drawing wherein, Figure 1 is a fragmentary elevation of an automatic electron tube mounting apparatus showing a portion of a chute of an anode loading member and an anode in jammed position in the chute and partly engaging a jig;

Figure 2 is an elevational view similar to that of Figure 1, except that the jig is shown during an intermittent movement thereof from the position depicted in Figure 1 and with the safety release of the invention deflected to permit release of the stuck anode from the chute; and Figure 3 is a view in cross-section taken along the line 3—3 of Figure 1.

As shown in Figure 1, an automatic apparatus for mounting or assembling electron tube parts to form an electrode cage, includes a fixed chute 10 having lateral recesses 11, 12 for engaging wings 13, 14 of an anode work piece 15. The portion of chute 10 shown is vertically disposed so that an anode is adapted to fall freely therefrom by gravity. Suitable controls, not shown, are provided for assuring a predetermined rate of one by one fall of a plurality of anodes.

The apparatus also includes a plurality of build-up tools or jigs 16 mounted in spaced relation along endless chain 17. Endless chain 17 is caused to move intermittently by suitable means, not shown, in steps of predetermined length, to dispose the jigs successively in vertically registered stationary position below the open end 18 of chute 10. Suitable locating and locking means 19, described more fully in the aforementioned copending application, may be employed to assure desired vertical registry between the chute 10 and a jig 16.

When in such desired vertical registry, mandrels 20, 21 fixed to and extending upwardly from the jigs 16, will be in axial registry with channels 22, 23 formed in anode wings 13, 14. A free fall in such registered position will cause the mandrels 20, 21 to enter said channels and the lower end of the anode to abut against an upper surface of the jig. When an anode is so received by the jig it will be fully clear of the lower end of chute 10, and further intermittent movement of a jig so loaded will occur in a satisfactory manner.

However, when anode 15 becomes stuck or jammed in the chute in a position where it partly engages mandrels 20, 21 and is partly held by the chute, as shown in Figure 1, further intermittent movement of the jig will be restrained by the stuck anode. Such restraint, however, is inadequate to stop movement of the chain 17, and as a consequence, the relative movement between the jig 16 and chute 10, will cause deformation of the anode and probable serious damage to the chute and jig involved. For example, the chute may be torn from its desired fixed position and the jig mandrels 20, 21 may be bent so as to destroy further utility thereof.

It is not feasible to stop movement of chain 17 in response to an abnormal restraint thereof, to prevent the aforementioned damage. This is for the reason that the chain assembly together with the large number of jigs mounted thereon, is relatively heavy, and requires an appreciable force for acceleration during each intermittent movement thereof. It is difficult to make this applied force discriminate between the relatively heavy normal load it is required to move, and the relatively slight increase in this load resulting from the restraint of a stuck anode. Moreover, even though such discrimination were feasible, it would require at least partial destruction of the anode 15 and possibly some damage to the chute 10 and jig 16, before the restraint of a stuck anode could make itself manifest. Furthermore, it would necessitate interruption in the operation of the mounting apparatus.

The foregoing and obvious solution to the problem is therefore unsuited to accomplish applicants' purposes.

Instead, the present invention provides for a safety release structure that is positive in action and permits release of a stuck anode without damage either to the anode or to the mounting apparatus and without interrupting the operation of the apparatus. The safety release structure according to the invention may comprise L-shaped member 24 pivoted on horizontal pin 25 extending through opposite walls 26, 27 of chute 10 defining a slot 28. The member 24 includes a weight 29 extending outwardly from the lower free end thereof and normally urges the member 24 against a shoulder 30 defined by the chute. In this position, the side 31 of member 24 will constitute an inner wall of the chute and serve as a guiding means for guiding an anode 15 to the jig aforementioned. Member 24 has a length that is substantially equal to that of the anode referred to, for a purpose that will become apparent.

It will be noted that the member 24 is disposed at the side of chute 10 facing the direction of movement of the jigs 16, as indicated by the arrows, and which side, if projected downwardly, lies in the path of movement of a jig after an anode has been loaded thereon. Therefore, if an anode should be restrained against a complete loading movement, as by being stuck or jammed in the chute with the lower portion of the anode engaging the mandrels 20, 21, as shown in Figure 1, movement of the jig in the direction of the arrows will cause engagement between the upper portion of the anode and the deflectable safety release member 24. Such engagement will cause the release member to swing outwardly on its pivot 25 and against the force of the weight 29 as shown in Figure 2. The release member 24 is free to rotate through an angle as large as 90°, to assure full release of a stuck anode no matter what its degree of engagement with the mandrels 20, 21. The fact that the release member 24 is substantially as long as anode 15, renders its release function effective even though the length of engagement between the anode and chute should be substantial, and that between the anode and mandrels 20, 21 should be very slight.

In most instances, the jamming of the anode occurs as a result of improper registry between the open end 18 of the chute and a jig 16. Therefore, when the anode has left the chute through slot 28 therein, as shown in Figure 2, the cause for the jamming is removed. But even though the initial cause for the jammed condition of the anode is so removed, the mere weight of the anode may be inadequate for completion of its downward movement into a desired mounted position. In this connection, it might be observed that the chute 10 is relatively long vertically and therefore in a normal mounting operation the fall of an anode is accompanied by an appreciable force which is required for a completed mounting thereof on a jig. This appreciable force is absent when the anode has been stopped in a jammed position and later attempts to resume its interrupted fall. As a consequence, after a jamming and release, an anode is incapable by its own weight to fall to properly mounted position.

This problem is very effectively overcome by the structure of the safety release of the invention. As indicated before herein, the safety release member 24 includes a weight 29 extending transversely from its free end. While this weight serves the purpose of returning the member to its undeflected position in slot 28 in chute 10, after deflection thereof by a stuck anode, it also serves the very important function of urging the anode into fully loaded position, as shown in Figure 2. The weight 29 provides a force roughly equalling that of an anode freely falling through the chute 10. Movement of the anode from a stuck position causes this weight to rest on and to traverse the upper end of the stuck anode to cause it to fall downwardly to a desired mounted position.

It will be apparent from the foregoing that we have provided an advantageous loading member for an electrode cage assembling apparatus, that not only affords a safe release of a jammed cage part, but also aids in completing the loading of the part after release from its jammed position, to thereby assure freedom from interruption during operation of the apparatus.

What is claimed is:

1. A loading apparatus comprising a vertical chute having a lower open end and vertical side walls and adapted to drop lengthwise an elongated work piece and a jig intermittently movable in a path below and normal to said chute, said jig including an elongated element having a free end extending towards the plane of said lower open end and adapted to receive said work piece in telescoped relation, said open end being spaced from the free end of said elongated element a distance less than the length of said work piece, whereby said work piece extends into engagement with said elongated element when said work piece is stuck in said chute adjacent said open end, and whereby said stuck work piece bears forcibly against one vertical side wall of said chute during further intermittent movement of said jig, said vertical side wall of said chute being movable outwardly to provide a side passageway for said stuck work piece through said chute, whereby said stuck work piece is free to move with said jig away from said chute, said side wall having a weighted portion extending to its lower end and adapted to engage the top of said work piece during movement of said work piece away from said chute, for completing the mounting of said work piece on said elongated element.

2. An automatic mounting apparatus comprising a loading chute having a vertical section terminating in a lower open end and adapted to guide a work piece to said open end, an assembling jig intermittently movable in a path below said open end and normal to said vertical section for momentary stoppage in a position directly below said open end, means adjacent said jig in said position for locking the jig in said position, whereby said jig receives said work piece in a desired mounted position when freely emitted by said open end, and means mounted on said chute adapted to releasingly engage a work piece stuck in said chute adjacent said open end and engaging said jig on resumed movement thereof for completing the mounting of such stuck work piece in said desired mounted position, said last named means comprising an elongated member pivotally mounted in the said chute at one end thereof, and having a laterally extending and relatively massive portion at the other end thereof, said elongated member being free to pivot to release a stuck work piece from said chute, said relatively massive portion being adapted to rest on top of a stuck work piece for urging said work piece into fully mounted position on said jig.

3. An automatic mounting apparatus comprising a vertically disposed chute having a lower open end and walls for guiding a work piece to said open end for free fall therefrom, an assembling jig intermittently movable in a a path below said open end for momentary stoppage directly below said open end, said jig having two mandrels extending upwardly therefrom and spaced in a direction parallel to said path and adapted to enter two laterally closed channels in said work piece on free fall thereof from said open end, and a safety release and loading member movably mounted on said chute adjacent said open end thereof, said member normally forming a part of said guiding walls for a freely falling work piece, and being movable outwardly of said chute in response to the force thereon of a work piece stuck in said chute adjacent said open end and in partial engagement with said mandrels on further movement of said jig for releasing said stuck work piece from said chute and for urging said work piece into a desired mounted position on said jig.

References Cited in the file of this patent

UNITED STATES PATENTS

| 2,084,734 | Krahl | June 22, 1937 |
| 2,155,958 | Schmidt | Apr. 25, 1939 |

FOREIGN PATENTS

| 43,186 | France | Mar. 9, 1934 |
| | (Addition to No. 759,539.) | |